US005684877A

United States Patent [19]
Sidik

[11] Patent Number: 5,684,877
[45] Date of Patent: Nov. 4, 1997

[54] METHOD OF PREVENTING VIDEOTAPE PIRACY

[76] Inventor: Kaled Sidik, P.O. Box 248 Safat 13003 Kuwait Nuzha Block 2 St 27 Villa 20, Kuwait City, Kuwait

[21] Appl. No.: 446,342

[22] Filed: May 22, 1995

[51] Int. Cl.$^6$ .................................................. H04L 9/00
[52] U.S. Cl. .................................. 380/54; 380/5; 273/139
[58] Field of Search .......................... 380/5, 54; 273/139; 283/86; 463/17

[56] References Cited

U.S. PATENT DOCUMENTS

| | | | |
|---|---|---|---|
| 4,601,239 | 7/1986 | Sillars | 273/139 |
| 4,832,341 | 5/1989 | Muller et al. | 463/17 |
| 4,993,714 | 2/1991 | Golightly | 463/17 |
| 5,128,779 | 7/1992 | Mallik | 283/86 |
| 5,360,235 | 11/1994 | Drummeter et al. | 380/54 |

*Primary Examiner*—Salvatore Cangialosi
*Attorney, Agent, or Firm*—Woodard, Emhardt, Naughton, Moriarty & McNett

[57] ABSTRACT

A method of preventing videotape piracy by including on authorized copies of a videotape a designator of authenticity and a code which serves as a lottery number.

19 Claims, 2 Drawing Sheets

METHOD OF PREVENTING VIDEOTAPE PIRACY

FIELD OF THE INVENTION

The present invention relates generally to videotape cassettes, and more particularly to a method of preventing piracy of videotape cassettes.

BACKGROUND TO THE INVENTION

The piracy of audio and videotape cassettes is a significant problem worldwide. For example, movie producers often spend millions of dollars to produce movies and distribute them on videotape, only to have unscrupulous parties misappropriate the producer's lawful profit by distributing unauthorized copies of the production. These videotape pirates have little, if any, cost associated with their production of counterfeit tapes, and are therefore able to price their product significantly below the cost associated with lawful enterprises.

In spite of attempts by various governments and trade groups to limit videotape counterfeiting and piracy, the problem continues to expand. Recent figures by the MPAA indicate that at least $250 million in potential revenues are lost to videotape pirates annually in the U.S. alone, while worldwide numbers are in excess of $2 billion. In fact, so significant is the problem to U.S. audio and videotape producers that intellectual property piracy has even been cited as the basis for trade sanctions against governments believed to take a less than effective approach to solving the problem.

It can be seen that a significant need exists for a method of thwarting videotape piracy, therefore restoring to movie producers the profits they lawfully deserve. The present invention addresses this need.

SUMMARY OF THE INVENTION

Briefly describing the present invention there is provided a method of preventing videotape piracy by including on authorized copies of a videotape a designator of authenticity and a code which serves as a lottery number.

One object of the present invention is to provide a method of preventing videotape piracy.

Further objects and advantages of the present invention will be apparent from the following description.

DESCRIPTION OF THE PREFERRED EMBODIMENT

For the purpose of promoting an understanding of the principles of the invention, reference will now be made to preferred embodiments and specific language will be used to describe the same. It will nevertheless be understood that no limitation of the scope of the invention is thereby intended, such alterations and further modifications in the illustrated embodiments, and such further applications of the principles of the invention as illustrated herein being contemplated as would normally occur to one skilled in the art to which the invention pertains.

As previously indicated, the present invention addresses the problem of videotape piracy by including on authorized copies of a videotape a designator of authenticity and a code which serves as a lottery number. The lottery number makes the authorized copies of the tape more valuable than counterfeit copies, and provides an incentive for persons to buy only the genuine article. The designator of authenticity enables the producer or organizer of the lottery to verify that the winning lottery number was lawfully obtained.

Figure 1:
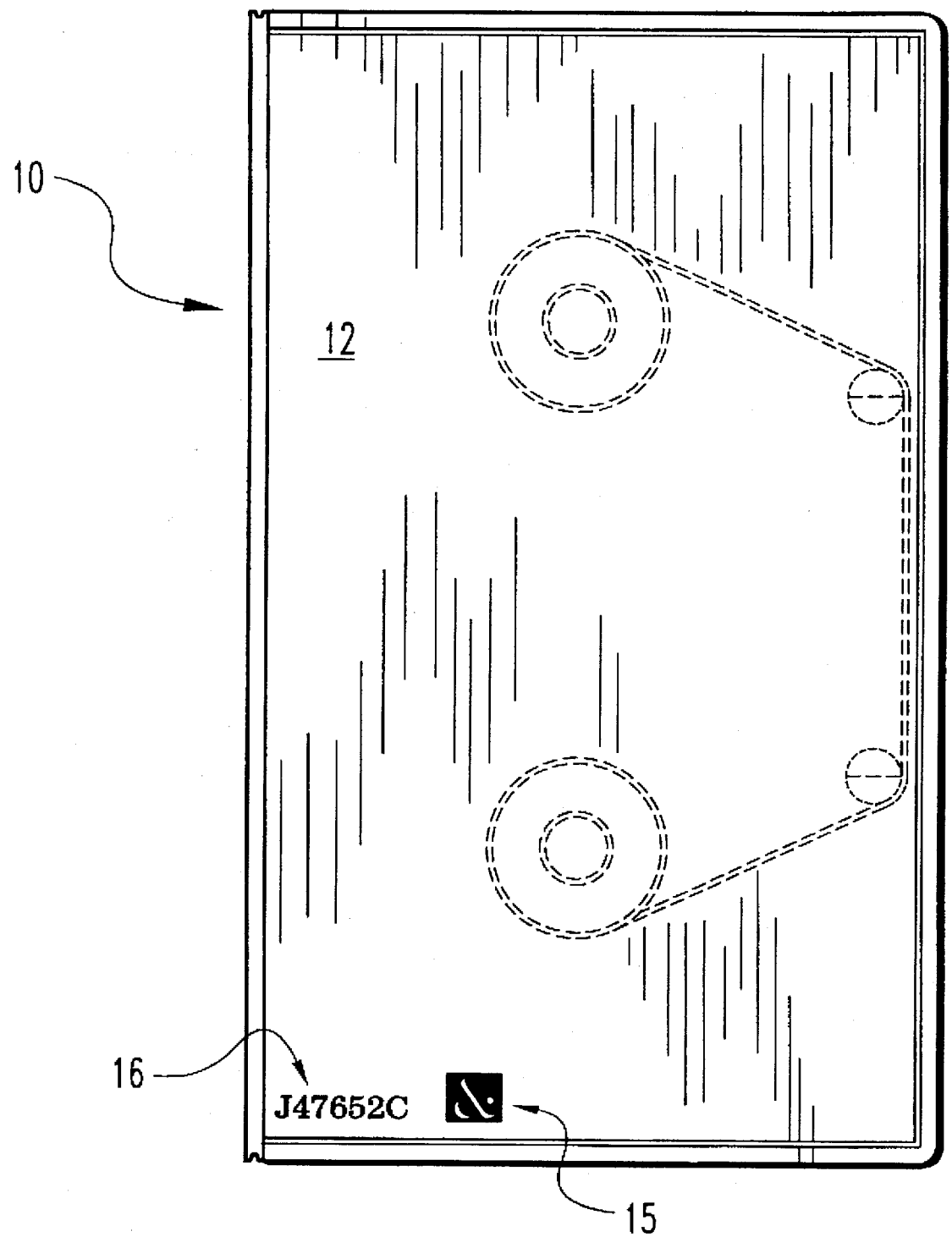
FIG. 1 shows one preferred embodiment of a videotape cassette which includes a designator of authenticity and a code which serves as a lottery number.
Figure 2:
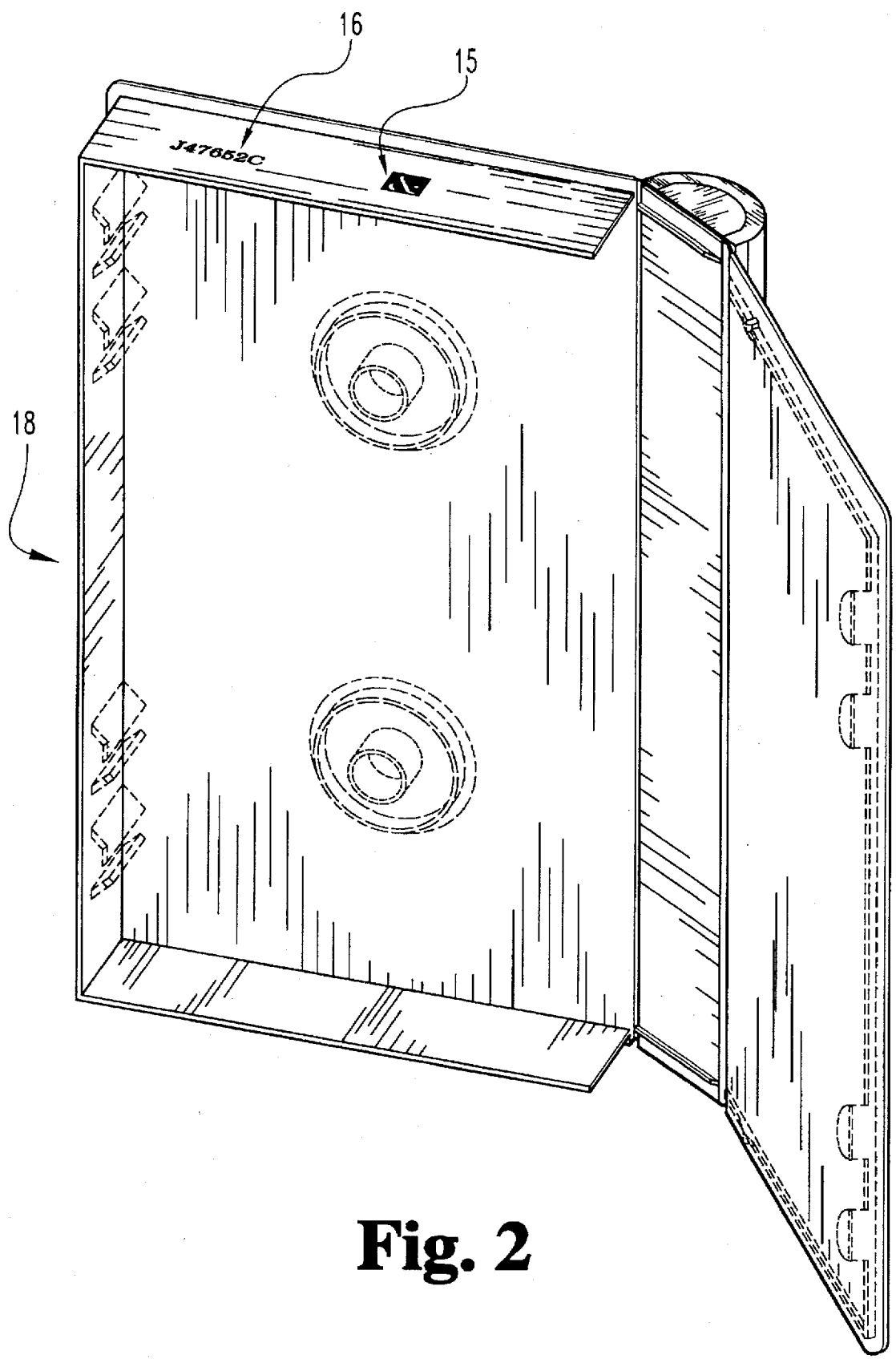
FIG. 2 shows a preferred embodiment of a videotape storage case which includes a designator of authenticity and a code which serves as a lottery number.

As shown in FIG. 1, videotape 10 includes tape member 11 and housing member 12, with a designator of authenticity 15 and lottery number 16 being included on housing member 12.

The designator of authenticity may be visible or invisible to the naked eye, with or without aids such as magnification or UV light. The designator of authenticity should be difficult to reproduce by counterfeiters, but must be verifiable by the lawful producer of the tape. For example, in one preferred embodiment the designator of authenticity is a hologram. Other preferred embodiments include designators of authenticity that are readable only by machine, such as machine-readable magnetic tape.

The designator of authenticity may be provided anywhere in or on the product, such as in or on the tape itself, in or on the tape housing, or in or on the packaging material. In one preferred embodiment the designator of authenticity is included both on the tape jacket and on the tape itself. For the purposes of this disclosure all methods of providing the designator of authenticity in or on the product or its packaging shall be referred to as providing the designator "on authorized copies" of the product.

For example, in one preferred embodiment the designator of authenticity and/or the lottery number are included on tape storage case 18, while in another preferred embodiment the designator is provided on housing member 12. Alternatively, the designator of authenticity and/or the lottery number may be included on tape member 11, in which case it may be viewable only through a tape playing machine.

Lottery number 12 is also proved as described above. Here too, the number may be provided anywhere in or on the product or its packaging. Further, the lottery number may be part of the designator of authenticity or it may be separate and distinct from that element. Preferably, the lottery number is readily visible to the naked eye and is easily read by the purchaser of the tape. Most preferably the lottery number is provided on both the product and on its packaging.

As to the use of the aforementioned items to prevent videotape piracy, one preferred method of using the designator of authenticity and the lottery number is to have a worldwide gala event that promotes the videotape and simultaneously acts as the lottery drawing. The gala event may be broadcast around the world (or at least to large, well-populated regions), and may include celebrity acts and other festivities. Most preferably, the lottery drawing would occur during the gala event so that maximum excitement about the drawing may be generated.

More particularly, one preferred embodiment of preventing videotape piracy by the method of the present invention is initiated when the producer makes a deal with a TV network to sponsor and/or host the worldwide premier of his "Movie," presented within a show live via satellite. Each and every country of the world TV station that has agreed to participate will also transmit the same show with the movie to their regional audience, either simultaneously or delayed to allow for time differences. Within this gala show and the movie, lucky numbers are drawn, and valuable properties such as real estate and other interesting prizes are given away to viewers around the world. The gala presentation is only for drawing lucky winners of the real estates and other extravagant prizes.

The picked lucky numbers correspond to numbers on the videocassettes marketed earlier in each country. Participating TV stations will broadcast this show along with the film.

Each videocassette is "Secret-Coded" by numbers and/or a hologram for the draw (raffles), and to avoid piracy. The buyers are advised to buy this legal and genuine copy to be eligible for the draw. The sales and the publicity campaign of the videocassette will commence worldwide simultaneously one year before the gala draw night, in arrangement with the local TV stations and the distributors. Preferably, distributors will promote the sale of the videocassettes in their territory by airing promotional spots in their market As indicated, to entice worldwide participation in the contest real estate properties in different parts of the world are selected as prizes. In order to glamorize the show and make it interesting to an international audience, celebrities and/or representatives of the participating TV stations of the world should be included in the show.

TV stations preferably air the movie from a single feed during the show. If satellite cost and the time differences make that strategy prohibitive, each TV station may be supplied with a broadcast quality tape of the movie and the show for airing at their preferred times. Alternatively, only the drawing process via satellite is transmitted live. This will update the worldwide audience of the lucky winners. Each winner will come or contact his/her regional TV station, where he/she is interviewed for a live broadcast via satellite. The TV station can subtitle or dub the movie in their local language.

Embassies can contribute by introducing the project and the producer to governments and local TV authorities internationally. In turn, each TV station will help the producer in contacting and negotiating a deal with a local videocassette distributor(s). Priority of distribution is given to the TV station itself. The task of international distribution of the videocassette can also be delegated to a reputable home videocassette distributor with international contacts against a fee. Alternatively, the videocassettes may be distributed through their producer's own sources or contacts.

The prizes and the show can also be underwritten by an internationally renowned bank/corporation to boost public confidence in the contest. These enterprises may also contribute cash prizes in exchange for advertising associated with the international marketing campaign.

Finally, the producer of the movie and the distributor of its videocassette should agree on an accounting strategy and the selling price of a videocassette. All unsold videocassettes and/or their lottery numbers should be accounted for and returned to the producer prior to the gala draw night. These returned and unsold lottery numbers will not be included in the draw. Commercial slots within the show and the film could also be sold to other interested parties or sponsors.

In the foregoing description is has been disclosed that the gala event may be broadcast around the world, or at least to several large, well-populated regions. For the purposes of this disclosure large, well-populated regions include, but are not limited to, metropolitan areas in North America, South America, Europe, Asia and the middle-east. All cites with populations in excess of 100,000 persons are considered to be metropolitan areas. Thus, for the purposes of this disclosure, "worldwide" broadcast is contemplated to include an international broadcast to at least two cities with populations in excess of 100,000 persons each.

It is to be appreciated that the foregoing method may be used to prevent the piracy of videotapes, audiotapes, computer software, books or any other materials or products which have a value separate and distinct from their lottery ticket value.

While the invention has been illustrated and described in detail in the drawing and foregoing description, the same is to be considered as illustrative and not restrictive in character, it being understood that only the preferred embodiment has been shown and described and that all changes and modifications that come within the spirit of the invention are desired to be protected.

We claim:

1. A method of preventing videotape piracy, comprising including on authorized copies of a videotape an authenticator and a code which serves as a lottery number; wherein said authenticator is a hologram, or is readable by the naked eye only with uv light or magnification or enhancement, or is readable only by machine.

2. A method according to claim 1 and further including the step of holding a lottery to select one or more winning lottery numbers.

3. A method according to claim 2 wherein the step of selecting said winning lottery numbers is broadcast.

4. A method according to claim 3 wherein the step of selecting said winning lottery numbers is broadcast worldwide.

5. A method according to claim 1 wherein the designator of authenticity is readable with the naked eye only with magnification or enhancement.

6. A method according to claim 2 wherein the selection of the winning lottery number is broadcast during a performance of the material contained on the videotape.

7. A method according to claim 2 and further including the step of awarding a real estate prize to the holder of at least one winning lottery number.

8. A method according to claim 7 and further including the step of awarding a real estate prize to more than one holder of a winning lottery number.

9. A method according to claim 8 wherein said real estate prizes are located in many of the regions in which the lottery winner selection is broadcast.

10. A method according to claim 1 wherein the designator of authenticity is a hologram.

11. A method according to claim 1 wherein the designator of authenticity is readable only with UV light.

12. A videotape protected against videotape piracy, comprising a tape member and a housing member, said housing member being marked with an authenticator and a code which serves as a lottery number; wherein said authenticator is a hologram, or is readable by the naked eye only with uv light or magnification or enhancement, or is readable only by machine.

13. The videotape of claim 12 wherein the designator of authenticity is readable with the naked eye only with magnification or enhancement.

14. The videotape of claim 12 wherein the designator of authenticity is a hologram.

15. The videotape of claim 12 wherein the designator of authenticity is readable only with UV light.

16. A videotape protected against videotape piracy, comprising a tape member, a housing member and a case member, said case member being marked with an authenticator and a code which serves as a lottery number; wherein said authenticator is a hologram, or is readable by the naked eye only with uv light or magnification or enhancement, or is readable only by machine.

17. The videotape of claim 16 wherein the designator of authenticity is readable with the naked eye only with magnification or enhancement.

18. The videotape of claim 16 wherein the designator of authenticity is a hologram.

19. The videotape of claim 16 wherein the designator of authenticity is readable only with UV light.

* * * * *